8573X
A. D. Stoor,
Cook Stove.
Patented Jan. 7. 1835.
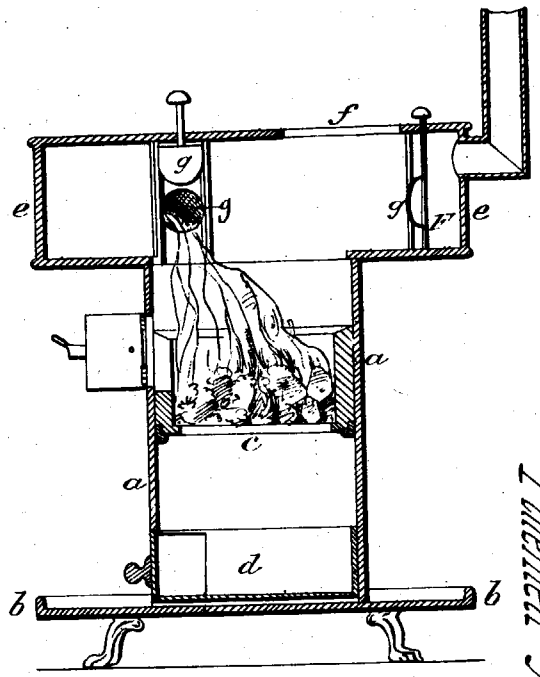
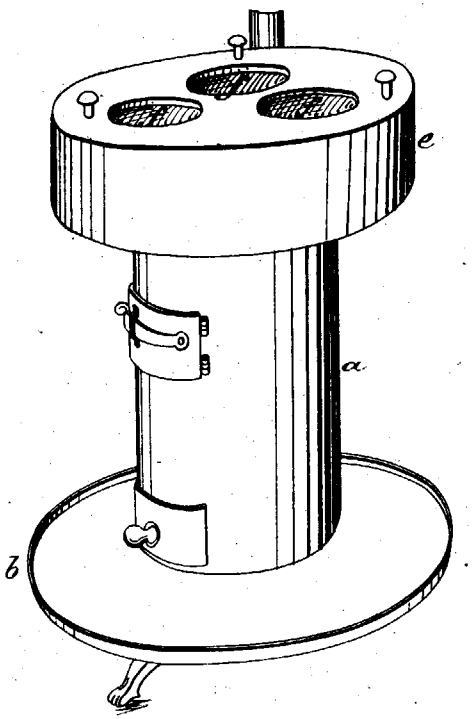

~~8951X~~ 8573X

Jan. 4. 1835

Abraham D. Spoor of Greene County New York

Letters Patent

The Schedule referred to in these Letters Patent and making part of the same co
taining a description in the words of the said Abraham D. Spoor himself of
his improvement in Stoves for cooking with anthracite coal called "the [illegible]
manda Cooking Stove."

To all to whom these presents shall come — Whereas the want of sufficien
flame and the limited extent of the horizontal surface of the fire in Stoves [illegible]
cooking with anthracite coal, hitherto in use have made it difficult if not
impossible, to expose more than one or two Boilers at once to the degree [illegible]
heat necessary to carry on culinary operations to advantage — and whereas
also it has been found difficult in such Stoves, to increase or diminish
the fire suddenly for . . . different processes, therefore —
Be it known that I Abraham D. Spoor of the Town of Coxsackie Coun
ty of Greene and State of New York have invented a new and useful i
provement in Stoves for cooking with anthracite Coal called the Salam
der Cooking Stove: by which it is intended to obviate the above diffi
lties, and of which the following is a true and exact Specification
The circular form (tho' not essential) being the best adapted to the arran
ment that is to be made of the boilers and other utensils for cooking is
one that will now be described. This Stove consists of a hollow cast
iron cylinder of from twelve to fifteen inches in height, placed vertically on a
circular hearth of about double its diameter, both having a common ce
tre. The grate is suspended within this cylinder about midway between the
base and top and it may be adjusted for rest or motion, and the part
above the grate may be lined with brick, stone, or other non conductors of h
The ash entrance may be above or below the hearth and should entirely
close the entrance for air at the base of the cylinder. On the top of this cy
linder is placed another hollow and concentric cylinder, of double the
diameter of the lower one, or somewhat larger if required. This may be abou
six inches in height and the lower plate of the upper cylinder has an ope
ing in its centre equal in extent to the top of the lower cylinder and

[illegible]

[illegible]
~~8951X~~ at the margin of this opening the two cylinders are joined together and united into one common chamber. The upper plate of the upper cylinder, or the top of the Stove has several openings for boilers and kettles or other cooking utensils, the openings for them being in such order and arrangement that all of them to the number of three or more stand partly over and are directly exposed to the fire and may consequently be kept boiling at the same time, thus avoiding the necessity of removing one after another successively to the fire, or of giving a rotary motion to the plate in which they are contained to attain the necessary degree of heat. For managing the heat under either of the boilers, a further provision is made by means of a flue within the periphery of the upper cylinder to extend from the opening for the pipe both ways. so as nearly to meet in front and encircle the Stove. Lateral outlets are made into this flue opposite to each boiler, which outlets or openings are provided with dampers, to shut or open them as occasion requires. The opening with the collar for the attachment of pipe may be on the outside of the periphery of the upper cylinder and there should always be a damper in the pipe to regulate the fire. The baking Roasting and other similar operations, are performed in separate bakers and roasters of suitable construction placed at proper distance around the lower cylinder or furnace.

I claim as my invention and improvement the drum or upper cylinder with the openings for boilers in the top so placed in relation to the lower cylinder or furnace that all the boilers to the number of three or more shall be partly over and directly exposed to the fire and so as to be kept at the required temperature at the same time and also the circular flue with lateral openings and dampers for directing the draft under either of the boilers when required whether said flue be constructed within or on the outside of the upper cylinder, and the general arrangement and combination of the respective parts, so as to constitute a Cooking Stove operating upon the principle or in the manner described

Witnesses
Robt Clarke
Rich<sup></sup>d H. Clarke

A. D. Spoor

[Patented January 7 1835]
(Jan 7 18[illegible])

854 Words